(12) United States Patent
Krupke et al.

(10) Patent No.: US 6,304,584 B1
(45) Date of Patent: Oct. 16, 2001

(54) BLUE DIODE-PUMPED SOLID-STATE-LASER BASED ON YTTERBIUM DOPED LASER CRYSTALS OPERATING ON THE RESONANCE ZERO-PHONON TRANSITION

(75) Inventors: William F. Krupke, Pleasanton; Stephen A. Payne, Castro Valley; Christopher D. Marshall, Livermore, all of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/187,327

(22) Filed: Nov. 6, 1998

(51) Int. Cl.[7] .............. H01S 3/10; H01S 3/04; H01S 3/16; H01S 3/091
(52) U.S. Cl. .............. 372/22; 372/20; 372/21; 372/36; 372/41; 372/75
(58) Field of Search .................. 372/75, 22, 36, 372/41, 20, 21

(56) References Cited

U.S. PATENT DOCUMENTS 5,123,026 * 6/1992 Fan et al. ...................... 372/72

* cited by examiner

*Primary Examiner*—Frank G. Font
*Assistant Examiner*—Armando Rodriguez
(74) *Attorney, Agent, or Firm*—John P. Wooldridge; Alan H. Thompson

(57) ABSTRACT

The invention provides an efficient, compact means of generating blue laser light at a wavelength near ~493+/−3 nm, based on the use of a laser diode-pumped Yb-doped laser crystal emitting on its zero phonon line (ZPL) resonance transition at a wavelength near ~986+/−6 nm, whose fundamental infrared output radiation is harmonically doubled into the blue spectral region. The invention is applied to the excitation of biofluorescent dyes (in the ~490–496 nm spectral region) utilized in flow cytometry, immunoassay, DNA sequencing, and other biofluorescence instruments. The preferred host crystals have strong ZPL fluorecence (laser) transitions lying in the spectral range from ~980 to ~992 nm (so that when frequency-doubled, they produce output radiation in the spectral range from 490 to 496 nm). Alternate preferred Yb doped tungstate crystals, such as $Yb:KY(WO_4)_2$, may be configured to lase on the resonant ZPL transition near 981 nm (in lieu of the normal 1025 nm transition). The laser light is then doubled in the blue at 490.5 nm.

42 Claims, 9 Drawing Sheets

BLUE DIODE-PUMPED SOLID-STATE-LASER BASED ON YTTERBIUM DOPED LASER CRYSTALS OPERATING ON THE RESONANCE ZERO-PHONON TRANSITION

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to means of generating blue laser light, and more specifically, it relates to the excitation of biofluorescent dyes (in the ~490–496 nm spectral region) utilized in flow cytometry, immunoassay, DNA sequencing, and other biofluorescence instruments.

2. Description of Related Art

Fluorescent probe techniques are widely utilized in a variety of biomedical research and diagnostic applications, owing largely to inherently high detection sensitivity and selectivity. Since the early 1950s, fluorescent techniques have been used to probe molecular interactions between small ligands and biological macromolecules, as well as interactions among components in biological assemblies (e.g., cells). Applications soon extended to the areas of nucleic add and cell membrane research. Fluorescent probes have increasingly been used by cell biologists to probe cellular and subcellular function structures, as in fluorescence microscopy imaging and immunofluorescence microscopy techniques.

A flow cytometer [1] is often used to implement biofluorescence techniques. In a flow cytometer, cells in a fluid suspension are stained with fluorescent dyes that bind to specific molecules on the surface of the cell or to the nucleic acids within the cell nucleus. These cells then pass in single file through a focused laser beam which excites the fluorescent dye molecules. The wavelength of the laser is chosen to match the wavelength of a fluorescence excitation band of the dye molecule. Appropriately placed detectors capture a portion of the scattered and fluorescent light emitted by the cell as it passes through the laser beam. Several different fluorescent dyes may be employed, each emitting at a wavelength differing from that of the others. A corresponding number of appropriately filtered photomultiplier detectors measure the fluorescent intensities from their corresponding dye emitters. Each data stream represents a distinct measurement of information about immunological marker molecules on the cell surface or in the nucleic acids of the nucleus. The use of antibodies for cell identification is possible because the external membranes of different kinds of cells express different moieties called cell surface antigens. Immunotyping is used to describe the science of identifying cell using antibodies. For example, antibodies are commonly used to identify leukocytes in human blood. The development of multiparameter flow cytometry [1] for immunotyping clinical material has provided new insight on diagnosis and management of disease. Using this approach, considerable information can be rapidly obtained for the treatment of immuno-deficiency diseases, such as AIDs, to evaluate immunosuppressive therapy associated with organ transplantation, and to manage cancer therapy. Clinical immunotyping is mostly applied to cells from the blood or bone marrow using antibodies labeled with fluoscein and/or phycoerthrin dyes, excited in an excitation band peaked at a wavelength near 493 nm. Using different antibodies labeled with fluorescein and other fluorochromes such as phycoerthrin, multiple cell types can be identified simultaneously using a single cell suspension in a flow cytometer.

In the past decade there has been a precipitous increase in interest in, and the prospects for, genetic medicine based on a complete mapping of the human genome. To sequence the human genome [2], chromosomal DNA fragments are selectively stained chemically with one of four different fluorescent dyes (one fluorescent color for each of the four genetic letters A, G, T, C), and passed through a multi-channel electrophoresis sequencing apparatus). The multiple channels are illuminated with laser radiation matching the excitation bands of the fluorescent dyes, and the genetic letter sequences are readout by detecting the positions of the four fluorescence colors. Four color fluorescence DNA sequencing [2] has enabled the onset of an international campaign to sequence the complete human genome in a few years time.

In spite of the vast number of fluorescent probes that are available for research purposes, only a handful of fluorescent dyes have gained wide-spread use in commercial biofluorescence instrumentation (such as the Model 373A DNA Sequencer produced commercially by Applied Biosystems Inc. (ABI), Foster City, Calif.). The dyes developed specifically for wide-spread commercial use in most flow cytometers [1], immunoassay [3] and four color fluorescence DNA sequencers [4] were selected (in part) for their ability to be efficiently excited by the 488 nm or 514 nm radiation from an argon ion gas laser (the only visible laser source then deemed practical for use in commercial bio-fluorescence instruments. These standard biofluorescence dyes, and their excitation (fluorescence) maxima in nm, are as follows [8]: FITC (fluorescein isothiocyanate) 494 (518), NBD-HA (aminohexanoic acid) 492 (548), tetramethylrhodamine 548 (578), and Texas Red 580 (604). The ABI dye primer product names are FAM, JOE, TAMRA, and ROX. Another widely used commercial dye in flow cytometers for immunotyping is phycoerythrin. Although the 488 nm laser line of the argon ion laser is a few nm to the blue side of the FAM excitation peak, the argon ion laser as been found (until now) to be the best practical source for most commercial biofluorescence instruments utilizing FAM and other dyes, such as phycoerythrin. Typical laser excitation powers of a few milliwatts to a few tens of milliwatts are employed in commercial biofluorescence instruments.

New four color dye staining techniques have been recently developed [9] to increase DNA sequencing throughput and accuracy. The dye (FAM), with an excitation peak wavelength near 494 nm, is used to absorb 488 nm excitation radiation from an argon ion laser, and the excitation energy is transferred (nonradiatively) to energy transfer primers (designated F10F, F10J, F3T, and F3R) that fluoresce at peak wavelengths wavelengths of 525, 555, 580, 605 nm, respectively.

As biofluorescent research, diagnostic, and clinical instrumentation applications expand and proliferate, there is a pressing need to provide a more compact, efficient, reliable, and long-lived dye excitation laser source than the argon ion laser, for use in these instruments, especially in clinically used flow cytometers and in DNA sequencers. A large preponderance of these instruments utilize the fluorescein dye primer FAM that is excited optimumly in the blue spectral region peaked at ~493 nm [8], or the fluorochrome phycoerythrin (peaked at the same wavelength).

Two leading approaches to producing generally blue laser sources are by (i) harmonic doubling of near infrared radiation from either AlGaAs (~860 nm) or InGaAs (~980 nm) laser diodes in quasi-phase-matched nonlinear optical waveguides [11], producing generally blue radiation near ~430 nm and ~490 nm, respectively; and (ii) harmonic doubling in bulk nonlinear optical crystals (such as KNbO3) of the near infrared radiation emitted from a diode-pumped, neodymium-doped solid state crystal laser operating on the quasi-three-level laser transition [12].

Direct harmonic doubling of AlGaAs laser diode radiation at ~860 nm in quasi-phase-matched waveguides is the baseline approach of two national consortia devoted to developing short-wavelength (~430 nm) blue laser sources for the low power optical data storage application. This approach requires the use of relatively expensive frequency-stabilized laser diodes, matched to the conversion peak of the nonlinear doubling waveguide, and very close control of operating temperature [11]. Operating lifetimes of the non-linear quasi-phased matched waveguides have proved too limited for commercial use [13]. Blue output powers have been generally limited to a few to tens of milliwatts, and prospects for the practical scaling of blue output power beyond tens of milliwatts is problematic.

The practical prospects of providing >tens of milliwatts of generally blue light by harmonic doubling of the fundamental infrared radiation from a diode-pumped rare-earth-doped solid state laser emitting in the near infrared spectral region are relatively greater than the approach just described. However, as discussed below, the use of the trivalent neodymium (Nd) rare-earth-ion as the active laser ion cannot produce the desired color of blue radiation preferred for exciting commercial biofluorescent probe dyes, especially the FAM and phycoerythrin dyes near ~493 nm.

To overcome the deficiencies of these two approaches, it is proposed to construct blue-radiation emitting diode-pumped solid state lasers (DPSSLS) using ytterbium-doped dielectric laser crystals, in particular preferred Yb doped apatite and tungstate crystals, operating on their resonance (true 3-level) ZPL transitions generally falling within in the spectral region from ~965–992 nm. The generated fundamental radiation at a wavelength within the ~965–992 nm spectral region is then harmonically doubled to the blue spectral region near ~493 nm using a suitable nonlinear harmonic doubler.

SUMMARY OF THE INVENTION

It is an object of the present invention to provide an efficient, compact means of generating blue laser light at a wavelength near ~493+/-3 nm, based on the use of a laser diode-pumped Yb-doped laser crystal emitting on its ZPL resonance transition at a wavelength near ~986+/-6 nm, whose fundamental infrared output radiation is harmonically doubled into the blue spectral region.

It is another object of the invention to provide a means for exciting biofluorescent dyes (in the ~490–496 nm spectral region) utilized in flow cytometry, immunoassay, DNA sequencing, and other biofluorescence instruments, generated by harmonically doubling infrared laser radiation at a wavelength near ~980–992 nm emitted from a Yb-doped crystal laser configured to lase on the resonance ZPL transition.

The present invention discloses a compact, efficient, diode-pumped solid state laser emitting at a blue wavelength with the spectral region from 490 to 496 (~493+/-3 nm), based on ytterbium doped laser crystals. As taught in the present invention, such a laser source can be provided by harmonically doubling the near infrared output radiation from a ytterbium doped crystal laser forced to operate on its zero-phonon-line (ZPL) transition. Preferred host crystals for this purpose will have strong ZPL fluorecence (laser) transitions lying in the spectral range from ~980 to ~992 nm (so that when frequency-doubled, they produce output radiation in the spectral range from 490 to 496 nm).

Such blue solid state lasers provided by this invention may also find competitive economic use in other large commercial applications that utilize blue laser sources, and that also could benefit from such an efficient, compact, reliable, and longlived blue laser source, such a optical data storage, consumer home HDTVs, and commercial theater image projection systems.

The invention involves the use of preferred Yb-doped apatite crystals such as Yb:Sr$_5$(PO$_4$)$_3$F, configured to lase on the resonant ZPL transition near 985 nm (in lieu of the normal 1047 nm transition). The laser light is then doubled into the blue at 492.5 nm. Yb:KY(WO$_4$)$_2$ The invention involves the use of alternate preferred Yb doped tungstate crystals, such as Yb:KY(WO4)2, configured to lase on the resonant ZPL transition near 981 nm (in lieu of the normal 1025 nm transition). The laser light is then doubled in the blue at 490.5 nm.

The use of the trivalent neodymium (Nd) rare-earth-ion as the active laser ion cannot produce the desired color of blue radiation preferred for exciting commercial biofluorescent probe dyes, especially the FAM and phycoerthrin dyes near ~493 nm, whereas this can be accomplished using the trivalent ytterbium (Yb) rare-earth-ion as the active laser ion.

The invention is useful in a number of applications, including determining the base sequence of said DNA fragments, reading the genetic letter sequence of chromosomal DNA fragments and immunotyping, immunoassaying and immunophenotyping cells labeled with specific antibodies. Examples of technology and methods for DNA sequencing and preparing fluorescent-labeled DNA are shown in U.S. Pat. Nos. 5,755,943, 5,639,874, 5,674,743 and 5,571,388, which are all incorporated herein by reference.

BRIEF DESCRIPTION OF THE TABLES

Table 1 lists known ZPL transition wavelengths of Yb doped dielectric crystals [15, 17].

Table 2 lists assumed laser model input values for calculating the laser performance of end-pumped Yb:S-FAP and Yb:KY(WO$_4$)$_2$ ZPL transition lasers emitting near ~980 nm.

DETAILED DESCRIPTION OF THE INVENTION

Figure 1:
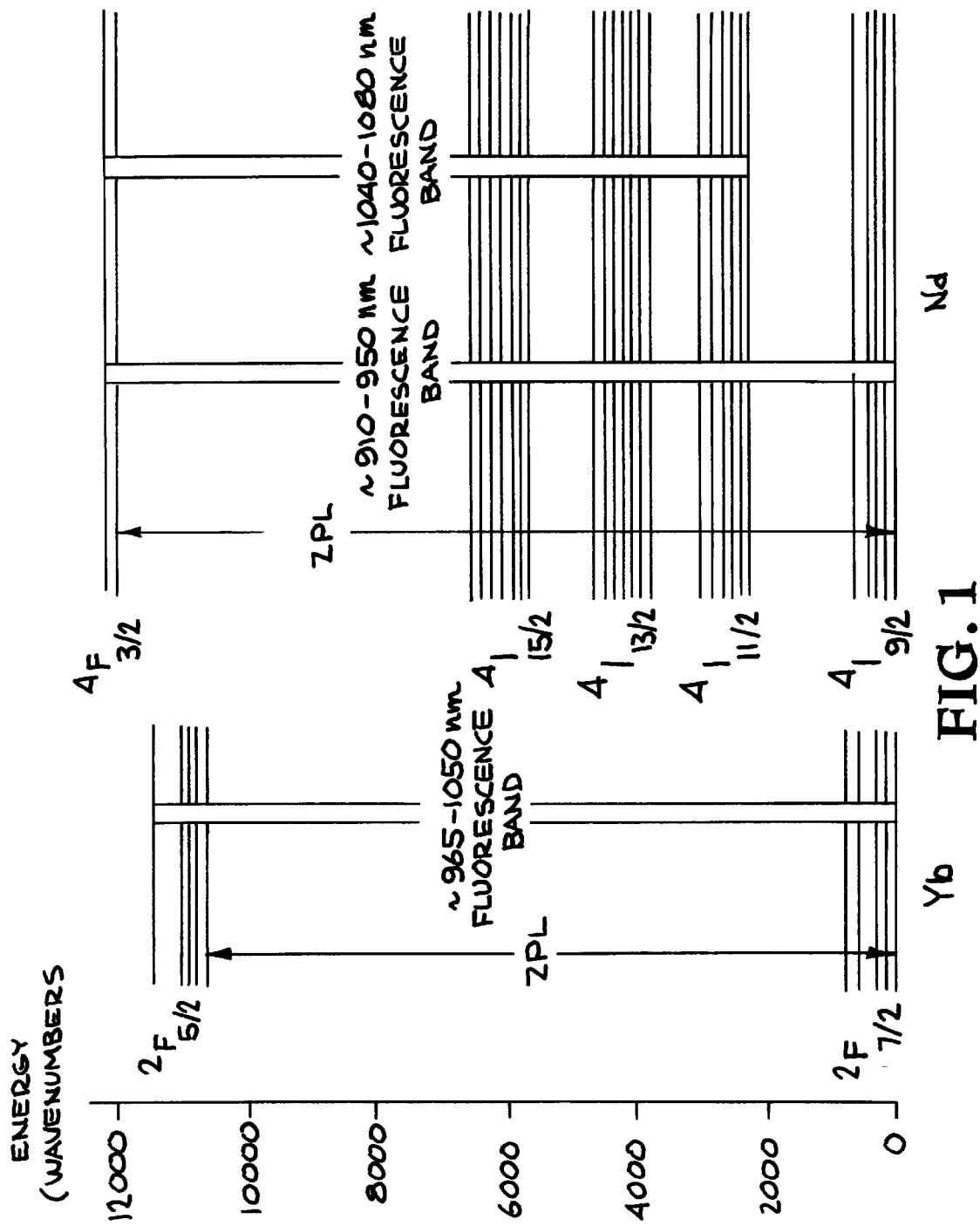
FIG. 1 shows the 4f electronic manifolds (and their crystal field Stark splittings) of the trivalent Yb and Nd rare earth ions in dielectric crystals (schematic), lying the energy range from 0 to 12,500 wavenumbers.

FIG. 1 shows the low-lying electronic energy levels for trivalent Nd and Yb laser ions. Each ion possesses electronic manifolds whose number and energy are characteristic of the number of optically active 4f electrons each ion possesses (3 for Nd and 13 for Yb). The 13 f-electrons of the Yb ion result in only two electronic manifolds, the ground $^2F_{7/2}$ manifold, and the excited $^2F_{5/2}$ manifold lying near ~11,000 wavenumbers in all dielectric crystals. Each of these manifolds is split into a number of Stark levels by the local crystal field surrounding the lattice site in which the Yb ion resides. The optical transition between the lowest Stark level of the ground manifold and the lowest Stark level of the excited manifold is called the zero-phonon-line (ZPL) transition, and is designated in FIG. 1. The ensemble of optical transitions between other pairs of Stark levels of the two manifolds give rise to an absorption band and an emission band generally lying spectrally to the blue and red of the ZPL transition, respectively.

The more complex energy level structure of the trivalent Nd ion is also shown in FIG. 1. The three f-electrons of the trivalent Nd ion result in several tens of electronic manifolds, the relevant lowest five of which are shown in FIG. 1. Each of these manifolds is also split into a number of Stark levels by the local crystalline electric field. The excited $^4F_{3/2}$ manifold serves as the upper laser manifold for all observed Nd ion laser transitions. All four of the lower lying $^4I$ electronic manifolds serve as terminal manifolds for laser transitions, giving rise to known [14] Nd laser emissions at wavelengths centered near ~940 nm ($^4I_{9/2}$), ~1060 nm ($^4I_{11/2}$), ~1340 nm ($^4I_{13/2}$), and ~1820 nm ($^4I_{15/2}$). In FIG. 1, only the two shortest wavelength fluorescence bands are shown. Directing attention to the resonance $^4F_{3/2}-^4I_{9/2}$ band near ~940 nm (analogous to the $^2F_{5/2}-^2F_{7/2}$ resonance band of Yb), this band will be characterized by a ZPL transition between the pair of lowest lying Stark levels of the $^4F_{3/2}$ and $^4I_{9/2}$ manifolds, and absorption and emission bands lying spectrally to the blue and red of the ZPL transition, respectively.

Figure 2:
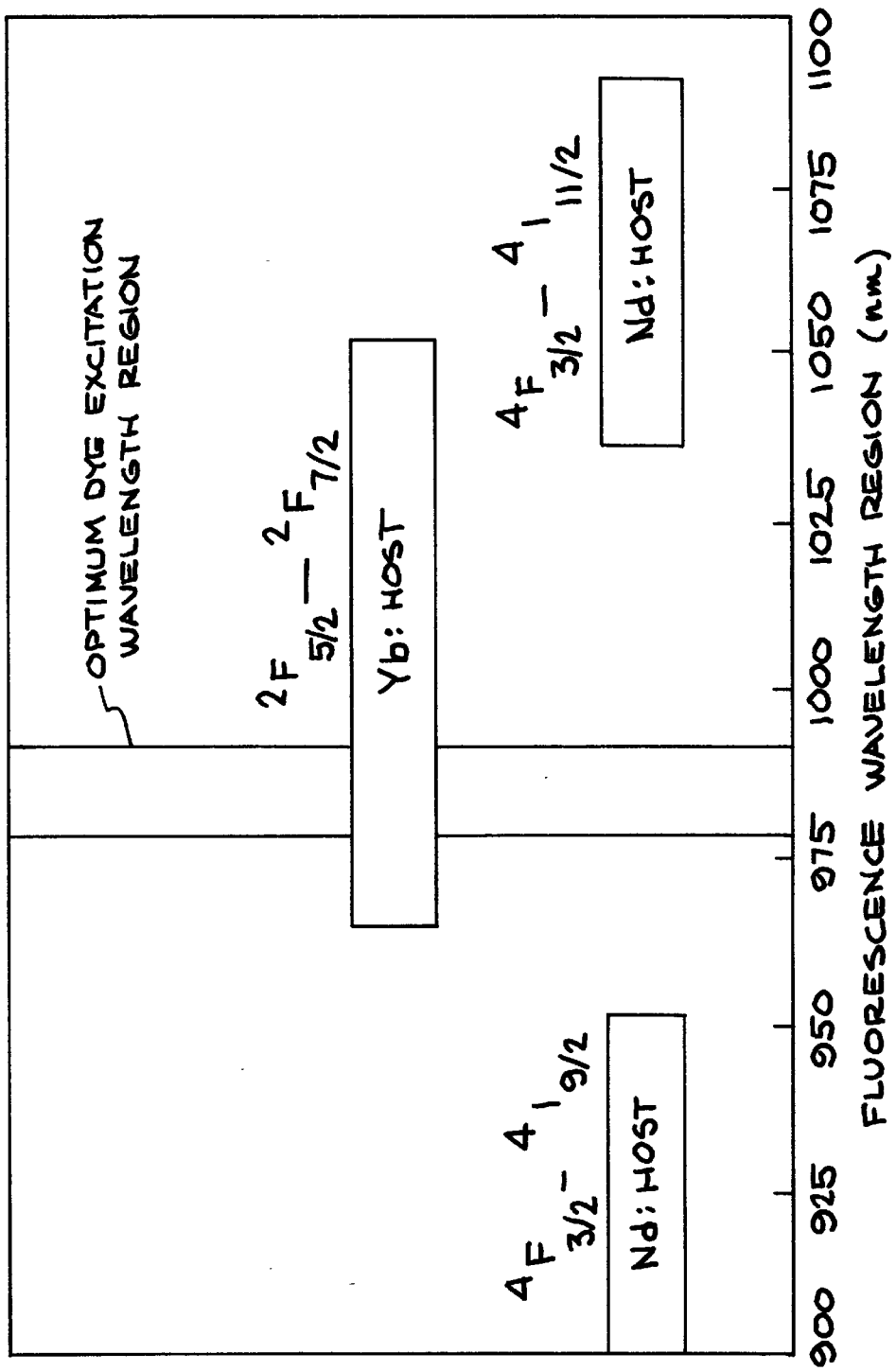
FIG. 2 shows the spectral ranges of known fluorescence transitions of trivalent Yb and Nd laser ions in dielectric crystals.

The specific wavelengths and intensities of fluorescence transitions occurring in the fluorescence bands of Yb and Nd ions are characteristic of the crystalline host material into which the Yb and Nd ions are doped, and can vary substantially from one host material to another. Several hundred absorption and emission spectra of Nd doped crystals have been reported in the literature and have been summarized by Kaminskii [14]. Yb doped crystals have not been studied nearly as much. However, prompted by the recent development of efficient InGaAs laser diodes emitting in the ~900–980 nm spectral region (overlapping the $^2F_{5/2}$ pump absorption bands of Yb) DeLoach, et. al. [15], measured and reported the polarized absorption and emission spectra of a number of Yb doped dielectric crystals. FIG. 2 shows the known [14,15] spectral regions of fluorescence transitions in Yb and Nd doped crystals. It also shows the band of infrared wavelengths from ~980 to ~992 nm, which when harmonically doubled, corresponds to blue emission wavelengths from ~490 to ~496 nm of interest for biofluorescence excitation laser sources, especially for the dyes FAM and phycoerthrin.

As can be seen from FIG. 2, the Nd ion characteristically fluoresces in the spectral range from ~900 to ~960 nm on the $^4F_{3/2}-^4I_{9/2}$ resonance band, and from ~1040 to ~1080 nm in the $^4F_{3/2}-^4I_{11/2}$ band. We see from FIG. 2 that the Nd laser ion will only be able to produce blue harmonically doubled radiation in the blue spectral region from ~450 to 475 nm (and in the green spectral region from ~520–540 nm). As examples, the well-known Nd:YAG laser crystal emits in the resonance band at a wavelength of ~946 nm [12] and produces harmonically doubled radiation at a wavelength of ~473 nm; the Nd:YVO4 laser crystal emits in the resonance band at a wavelength of ~915 nm and produces harmonically doubled radiation at a wavelength of ~456 nm. In general, harmonically-doubled resonance Nd doped crystal lasers can only generate blue light at wavelengths well outside the spectral region for optimally exciting fluorescein-based biofluorescent dyes, such as FAM and phycoerthrin.

In contrast, again as seen from FIG. 2, the Yb ion fluoresces characteristically in the spectral range from ~965 to ~1060 nm on the singular $^2F_{5/2}-^2F_{7/2}$ resonance band. By forcing the Yb ion to emit laser radiation on the shorter wavelength transitions of this band (generally on the ZPL transitions in the ~965 to 992 nm region), such Yb lasers can be harmonically doubled to produce the desired ~490–496 nm bue radiation, and especially ~493 nm radiation, optimum for exciting fluorescein based dyes such as FAM and phycoerthrin. To achieve practical laser sources of ~490–496 nm blue radiation, Yb doped crystals with superior spectroscopic properties in the spectral region from ~980 to 992 nm will be preferred. Payne, et al. [15, 16] have developed an analysis that identifies three spectroscopic figures-of-merit (FOM) for Yb lasers operating on the $^2F_{5/2}-^2F_{7/2}$ resonance manifold (including the ZPL transition): 1) a large laser (ZPL) transition cross-section, 2) a small value of the pump intensity, I-min, that renders the laser crystal transparent at the laser wavelength (i.e. sufficient to overcome resonance absorption at the laser transition wavelength). This minimum pump intensity ("I-min") varies inversely with the pump transition cross-section, so a large pump transition is desired, and 3) large Stark splitting, $E_p$, between pump terminal Stark level and the initial laser transition Stark level.

Figure 3:
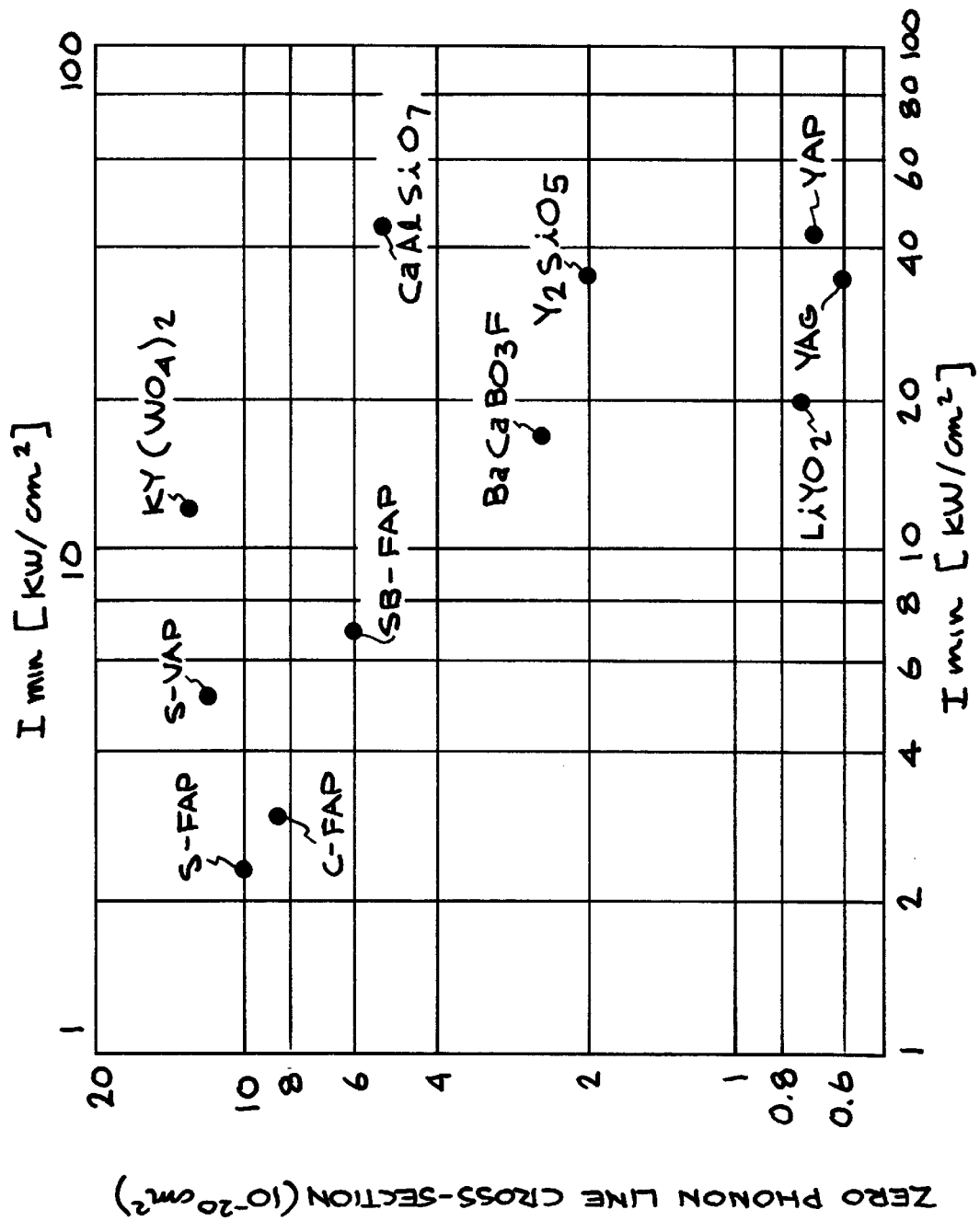
FIG. 3 shows ZPL laser transition figures-of-merit (FOM) values for known Yb doped dielectric crystals.

As mentioned above, DeLoach, et al. [15] reported quantitative polarized absorption and emission spectra of most known Yb doped dielectric crystals. Additional data by Mikhailov [17] is also relevant. From these data one can determine the ZPL wavelengths, ZPL transition cross-sections of candidate Yb crystal laser materials, pump transition cross-sections (and thereby I-min values), and the excited manifold Stark splitting FOM for these materials. FIG. 3 shows the results of this analysis, plotted on a log-log scale to better contrast the FOMs of candidate Yb laser materials. FIG. 3 plots pairs of values (for each Yb doped crystal) of the ZPL transition cross-section and I-min. Yb doped materials with superior laser spectroscopic characteristics for achieving relatively low laser threshold and high power conversion efficiency will lie to the upper left quadrant of FIG. 3. Prospective Yb doped ZPL transition gain materials lying to the lower right quadrant of FIG. 3 will generally exhibit higher laser threshold pump flux and lower power conversion efficiencies, for a given available pump flux.

Figure 4A:
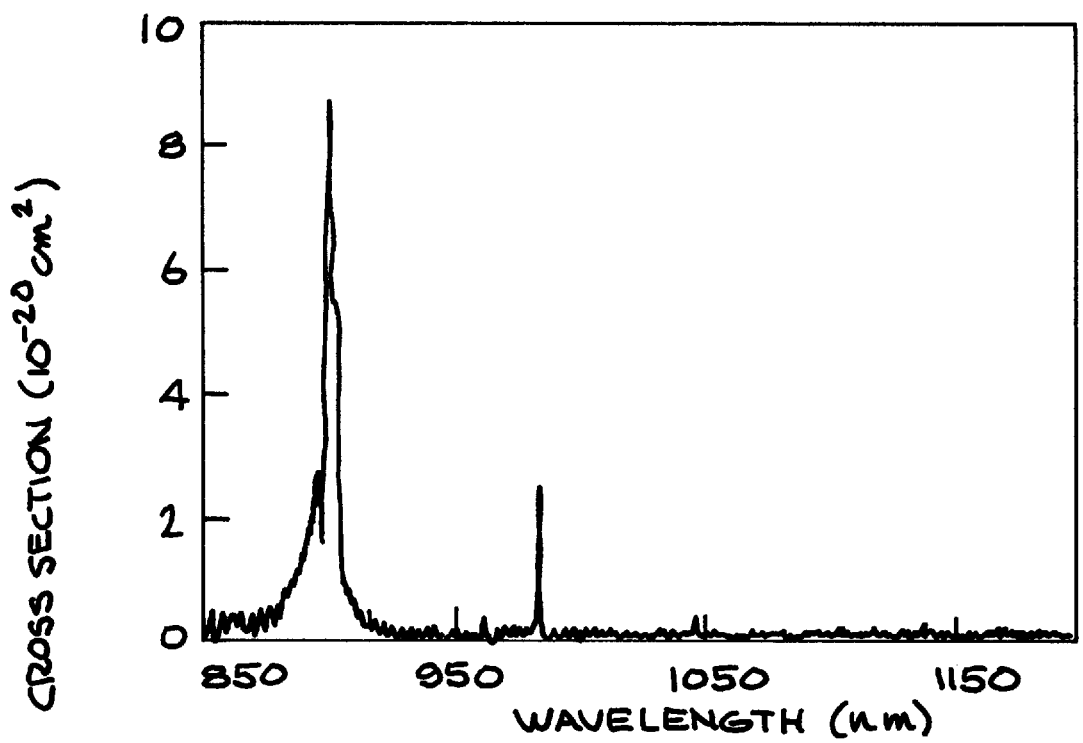
FIGS. 4A and 4B show the polarized absorption and emission spectra, respectively, of Yb:S-FAP for the electric field polarized parallel to the c axis of the crystal [18].
Figure 4B:
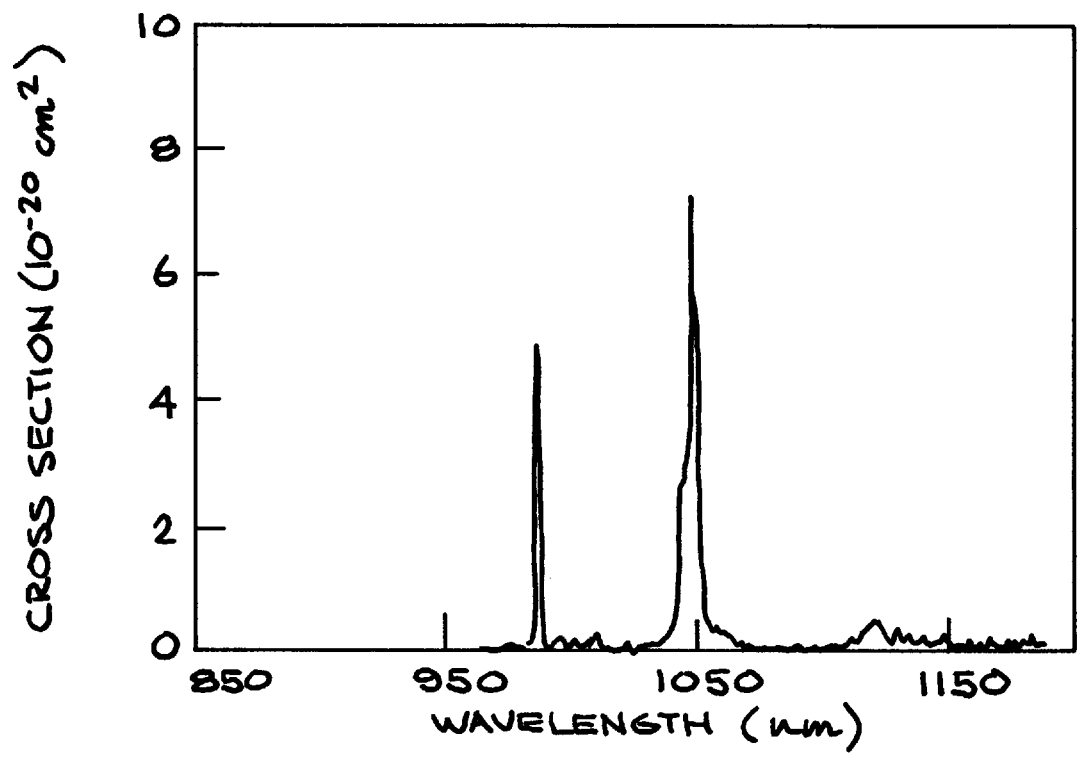
Figure 5A:
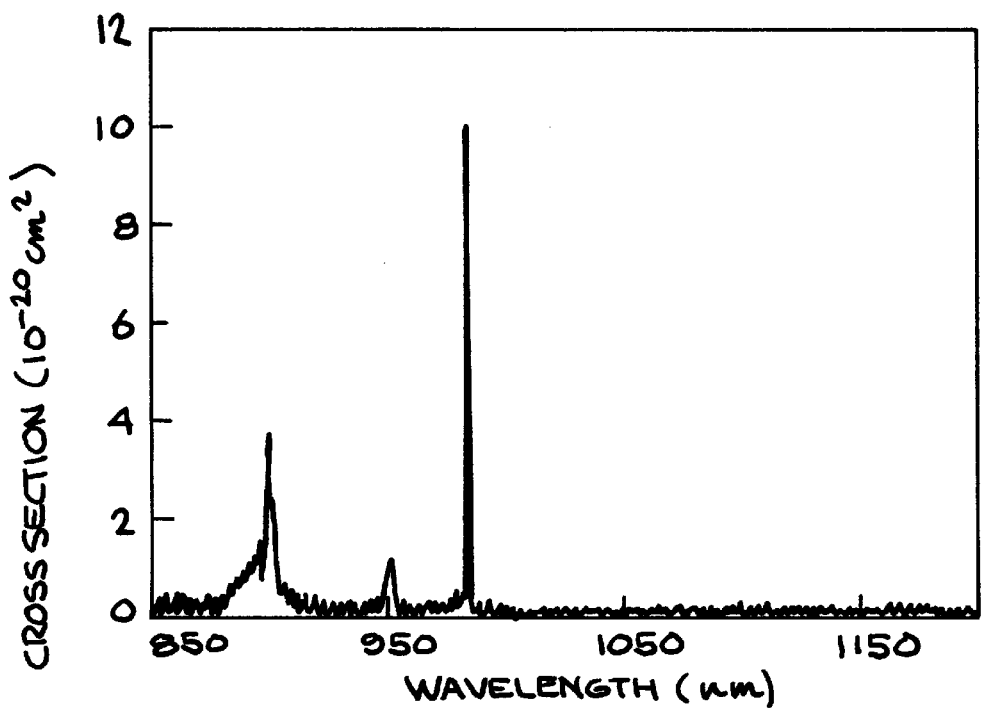
FIGS. 5A and 5B show the polarized absorption and emission spectra, respectively, of Yb:S-FAP for the electric field polarized perpendicular to the c axis of the crystal [16].
Figure 5B:
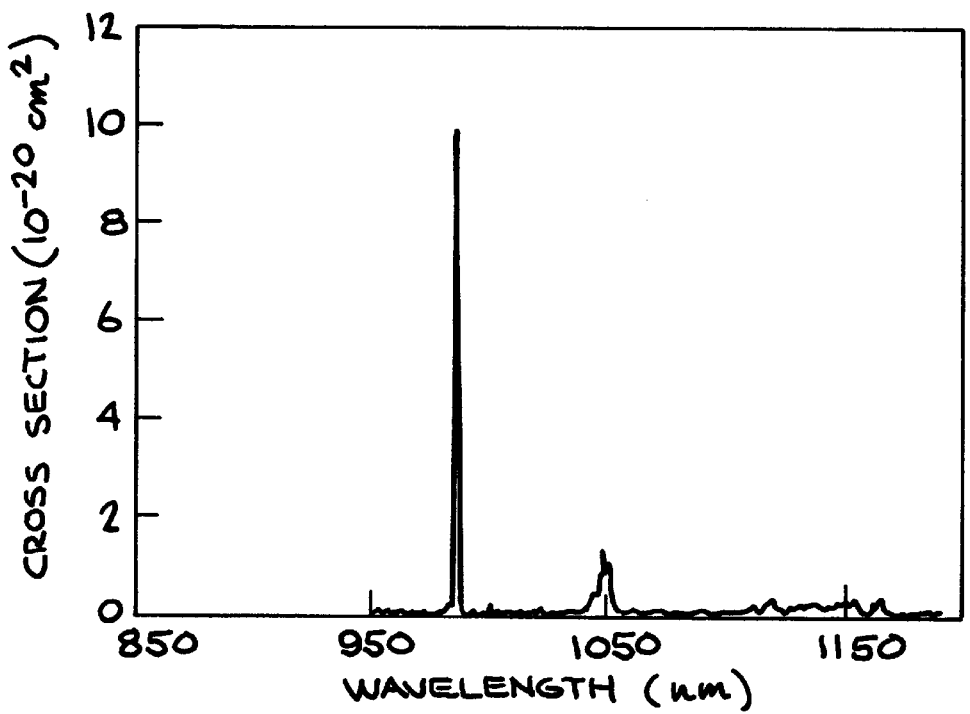

Among all presently researched Yb doped dielectric crystals with measured absorption and emission spectra, the class of Yb doped apatite crystals are seen from FIG. 3 to exhibit the highest FOMs for ZPL transition lasers, and accordingly are preferred Yb-doped crystals for use in the present invention. According to Table 1, the apatite Yb doped crystals also all exhibit ZPL transition wavelengths lying in the desired spectral range (983–986 nm). FIGS. 4A and 4B show the polarized absorption and emission spectra, respectively, of Yb:S-FAP [18] for the electric field polarized parallel to the c axis of the crystal. FIGS. 5A and 5B show the polarized absorption and emission spectra, respectively, of Yb:S-FAP [16] for the electric field polarized perpendicular to the c axis of the crystal. Laser gain media and laser systems comprising Yb:FAP and related materials are disclosed in U.S. Pat. No. 5,280,492, which is incorporated herein by reference [19]. Ytterbium doped vanadate laser host crystals having the apatite crystal structure (and Yb absorption and emission spectra similar to Yb:S-FAP) are disclosed in U.S. Pat. No. 5,341,389, which is incorporated herein by reference [20]. From FIGS. 4 and 5, we see that the Yb doped apatite crystal exhibits a strong narrow, highly polarized (electric field perpendicular to the crystal c-axis) ZPL transition, and broader, strong polarized (electric field parallel to the crystal c-axis) pump absorption transition lying near 900 nm, and well to the blue of the ZPL transitions (i.e., manifests a large excited manifold Stark splitting). FIGS. 4 and 5 also show that the apatite also possesses a strong, highly polarized (electric field perpendicular to the crystal c-axis) emission feature at the longer wavelength of ~1050 nm. The latter transition terminates on a Stark level of the $^2F_{7/2}$ ground manifold lying near 600 wavenumbers, and accordingly has a relatively low thermal population at room temperature (compared to the population in the ground Stark level). Thus, when the excited $^2F_{5/2}$ manifold of Yb:S-FAP is pumped to produce a population inversion and gain in the crystal in the ZPL transition, a higher gain will also be produced in the longer wavelength ~1050 nm transition. Thus, to force laser oscillation in the desired shorter-wavelength ZPL transition, optical elements must be incorporated into the laser resonator that provide selective loss at the longer wavelength ~1050 nm transition. In doing so, the net round-trip gain on the ZPL transition can be made to exceed that on the longer wavelength transition, thus suppressing oscillation at the longer wavelength. Optical elements that can provide the required selective loss include dichroic coatings on the laser resonator mirrors, and (if the gain transitions are appropriately polarized) a polarizer placed in the laser resonator with an appropriate orientation relative to the gain crystal axes. Inspection of the relative polarizations of the pump, ZPL, and parasitic longer wavelength transitions in Yb:S-FAP, indicate that either or both dichroic and polarization methods for long wavelength transition suppression may be employed. Overall then, the quantitative spectroscopic features of Yb:S-FAP (and, similarly, other Yb doped apatites) are essentially ideal for Yb doped crystal lasers operating on their ZPL transitions, and enable the design and realization of efficient and practical near infrared lasers with outputs in the 983–986 nm spectral region.

TABLE 1

Zero-Phonon-Line Transition Wavelengths of Yb:Host Crystal [15].

| Host Crystals | ZPL Transition Wavelength (nm) |
|---|---|
| LiYF4 (YLF) | 972.0 |
| LaF3 | 974.7 |
| SrF2 | 966.5 |
| BaF2 | 966.7 |
| KCaF3 | 972.0 |
| KY3F10 | 974.2 |
| Rb2NaYF6 | 968 |
| BaY2F8 | 972.6 |
| Y2SiO5 (YOS) | 979 |
| Y3Al5O12 (YAG) | 968.3 |
| YAlO3 (YAP) | 978.5 |
| Ca5(PO4)3F (FAP) | 983.5 |
| Sr5(PO4)3F (S-FAP) | 985.3 |
| Sr5(VO4)3F (S-VAP) | 986 |
| LuPO4 | 976.1 |
| LiYO2 | 972.6 |
| ScBO3 | 974.6 |
| KY(WO4)2 | 981.4* |
| KGd(WO4)2 | 981.3* |

*values taken from ref [17].

Figure 6:
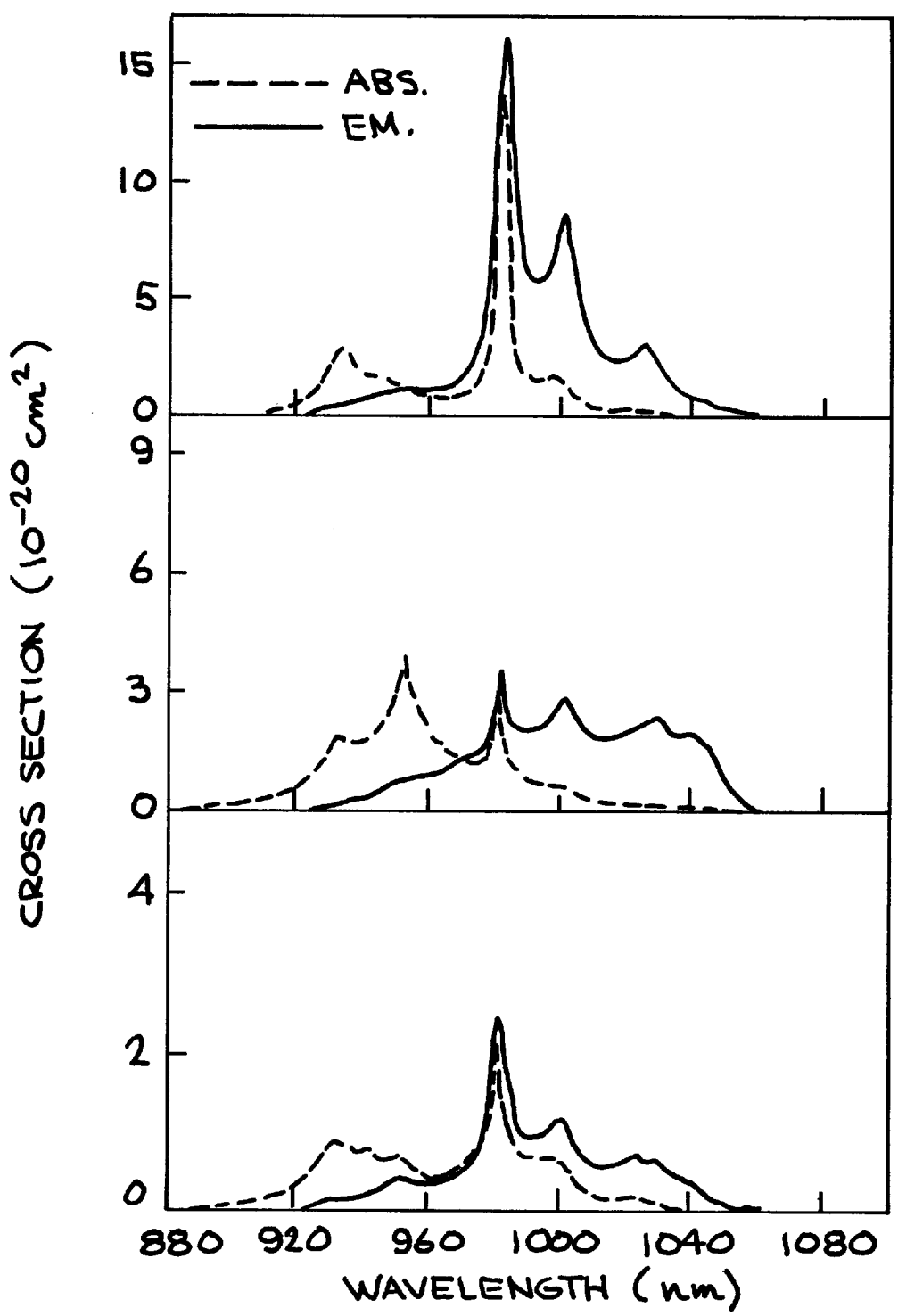
FIG. 6 shows the polarized absorption and emission spectra of Yb doped KY(WO4)2 crystal [17], for the electric field polarized parallel to the a, b, and c crystal axes.

FIG. 6 shows the polarized absorption and emission spectra of Yb doped Yb:KY(WO$_4$)$_2$ crystal [17], with electric fields polarized parallel to the a, b, and c crystal axes. This crystal exhibits a strong polarized pump absorption transition near ~933 nm and a very strong polarized ZPL transition at a wavelength of 981 nm. The excited manifold Stark splitting between these two transitions is less than that found for the apatites, but appears to be sufficiently large to be for practical laser design. Similarly, although the pump transition cross-section is smaller than those found in the apatites (and therefore results in a larger value for I-min for the tungstates than found in the apatites), Yb doped double tungststates lie sufficiently within the upper left quadrant of FIG. 3 to be a preferred Yb doped ZPL transition laser crystal in the present invention.

The Yb doped crystals lying in the lower right quadrant of FIG. 3 possess relatively weak ZPL transition cross-sections and relatively high values of I-min, and accordingly do not possess spectroscopic features that easily lend themselves to the realization of practical ZPL transition lasers emitting in the 965–992 nm spectral region.

Figure 7:
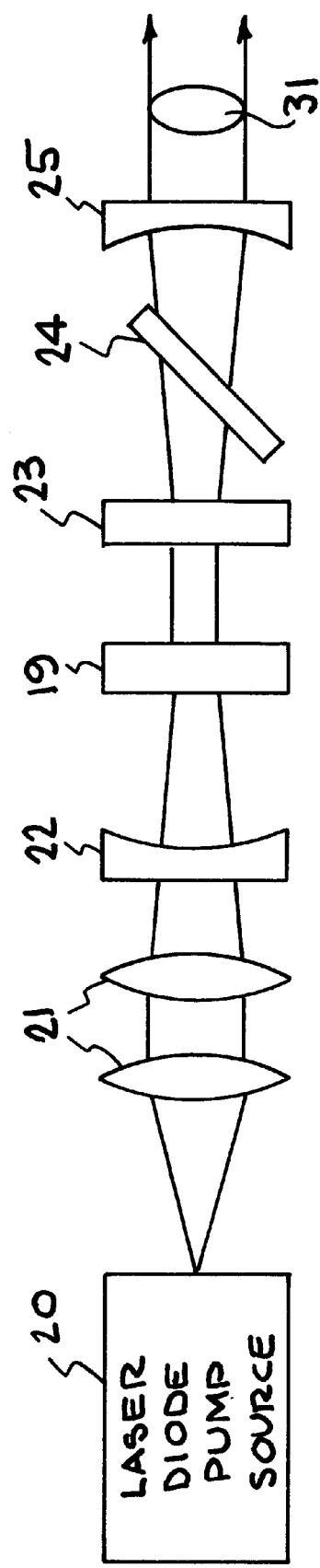
FIG. 7 shows a schematic layout of the essential components of the ~493 nm blue laser device of the present invention.

FIG. 7 shows a schematic layout of the essential functional components of a ~493 nm blue laser device of the present invention. The laser comprises of six main elements: a laser diode pump source 20, a laser resonator cavity resonant at two wavelengths (~986 and ~493 nm) formed by mirrors, 22 and 25, a Yb-host laser gain crystal 19, a harmonic doubling crystal 23, a polarizer 24, and pump coupling lenses 21. The Yb-host gain element, harmonic doubling crystal, and polarizer are placed within the laser resonator cavity. The laser cavity mirror 22 is coated on its inner surface with a dichroic dielectric coating that allows high transmission of pump light at a wavelength matching the pump transition wavelength (nominally in the 900–950 nm region), and that highly reflects at the ZPL transition wavelength of the Yb-host gain material, and at half the ZPL transition wavelength (i.e, at the harmonically doubled wavelength, ~493 nm). This dichroic should also possess a relatively low reflectivity at wavelengths to the spectral red of the ZPL transition, where optical gain in the pumped Yb gain medium may be present. The laser output coupling mirror 25 also has a dichroic coating placed on its inner surface that provides high reflectivity at both the pump wavelength (i.e., in the 900–950 nm resion) and at the Yb-host ZPL transition laser wavelength (~986 nm), and provides an intermediate value of reflectivity at half the ZPL transition wavelength (i.e., at ~493 nm). The value of reflectivity at ~493 nm is selected to optimize the power conversion efficiency from pump light to blue output light. This dichroic coating is also designed to provide significant transmission at wavelengths lying to the spectral red of the ZPL transition where the Yb-host gain element may provide amplification.

Pump coupling lenses 21 collect, shape, and transport pump light through the resonator mirror 22 and its dichroic coating, and focuses it in the Yb-host gain crystal element 19. The polarizer element 24 is oriented to allow a maximum transmission of polarized light at the ZPL transition wavelength of the Yb-host gain element, while increasing the effective loss at longer wavelengths emitted by the Yb-host gain element. In operation, the pump light deposited in the Yb-host gain element creates a population inversion on the ZPL transition and other longer wavelength transitions. However, the relatively higher effective losses at these longer wavelength transitions, provided in the laser cavity by the oriented polarizer and by the dichroic resonator mirrors 22 and 23, causes the threshold pump flux for the longer wavelength transitions to be larger than that of the ZPL transition, resulting in laser oscillation at the ZPL transition wavelength near ~985 nm. Efficient operation of a Yb-FAP laser on its ZPL transition has been demonstrated [25] using cavity dichroics alone to suppress oscillation at longer wavelength transitions.

Desired blue light near ~493 nm is achieved through inclusion of a nonlinear harmonic doubling crystal 23 within the laser cavity. The ~986 nm radiation generated within the laser cavity at the ZPL transition interacts with the doubler crystal and generates harmonic radiation within the cavity at a wavelength of ~493 nm. Laser output at the desired wavelength of ~493 nm is emitted through the partially transmitting (at ~493 nm) dichroic mirror on the output coupler mirror 25.

At the particular wavelength range of interest to this invention (near ~986), preferred nonlinear harmonic materials are available which can be configured to double under highly favorable non-critically phase-matched (NCPM) conditions. It is well known in the field of harmonic conversion that it is highly advantageous to utilize a nonlinear harmonic doubler that is non-critically phased matched (NCPM), that is, a doubler for which the phase-matching direction of the fundamental and harmonically doubled radiation is along a principal optical axis of the crystal. In this case, there is no spatial "walk-off" of the fundamental and frequency doubled laser beams. In the context of the present invention, the fundamental wavelength lies near ~986 nm. A review of the nonlinear optics literature indicates that there are two non-linear crystals that may be used to generate ~493 nm blue light in the non-critical phase matched (NCPM) condition, at or near room temperature: 1) so-called B-cut $KNbO_3$ [21], and 2) KTP crystal doped with a few percent niobium, tantalum [22] or sodium [23]. At the fundamental wavelength of ~986 nm, an alternate NCPM harmonic doubler material is LBO [24], operated at a temperature near 240°.

Figure 8:
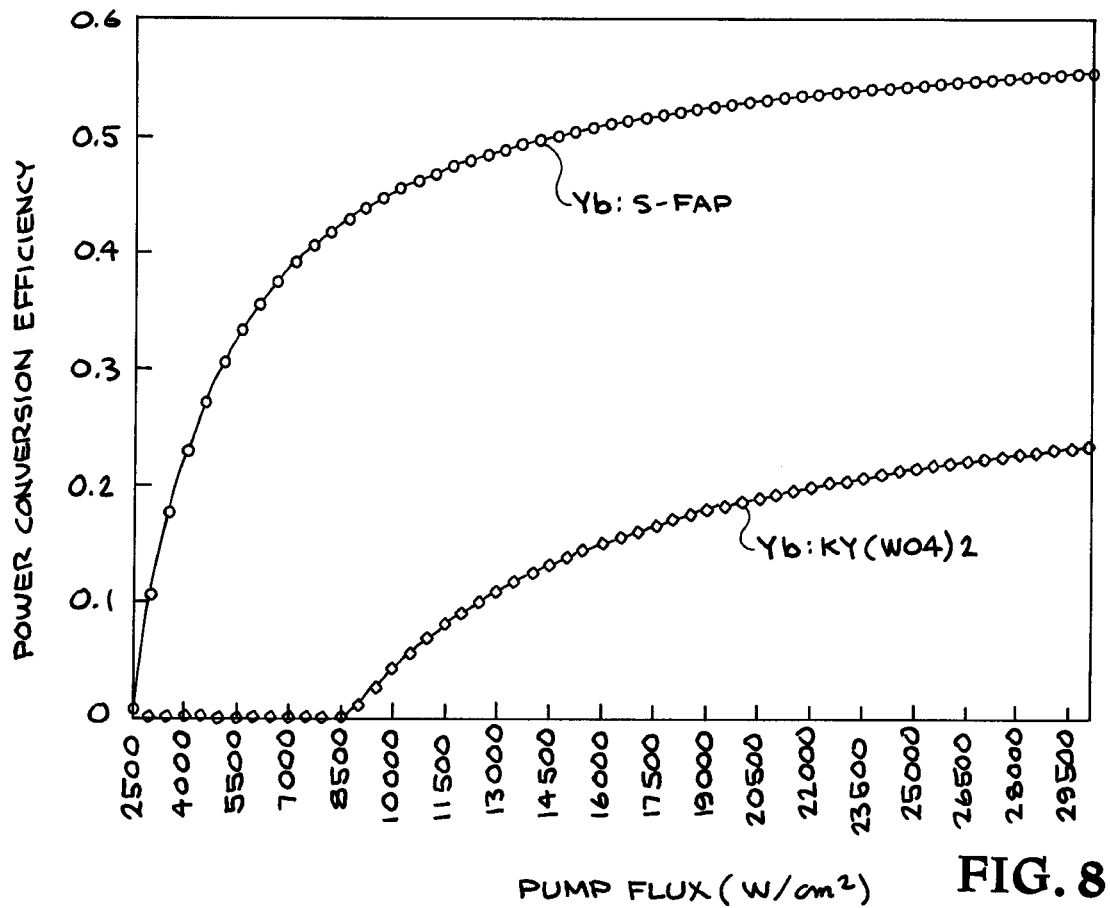
FIG. 8 shows the calculated output power efficiencies of end-pumped Yb:S-FAP and Yb:KY(WO$_4$)$_2$ ZPL transition lasers, for an assumed value of the product of Yb doping concentration timed gain crystal length equal to $2 \times 10^{19}$ ions/cm$^2$.
Figure 9:
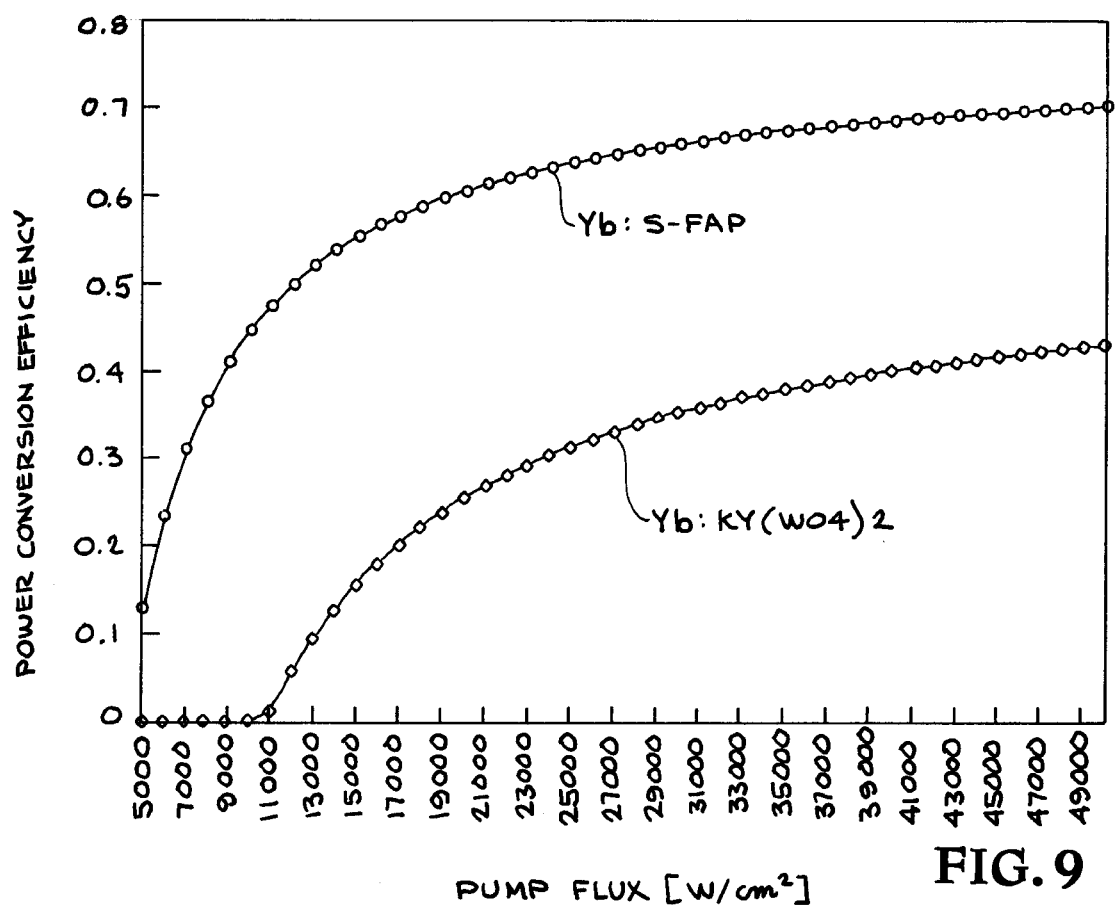
FIG. 9 shows the calculated output power efficiencies of end-pumped Yb:S-FAP and Yb:KY(WO$_4$)$_2$ ZPL transition lasers, for an assumed value of the product of Yb doping concentration timed gain crystal length equal to $4 \times 10^{19}$ ions/cm2.

To estimate the performance of a Yb:host laser operating at the ZPL transition wavelength, we utilize the theory of Beach [26] that gives a means for calculating the optimized laser output of a 3-level laser in terms of the pump flux, Yb doping concentration ($n_0$), crystal gain length ($l_s$), resonator single-pass transmission (T), and output coupling fraction at ~986 nm ($R_{out}$). FIGS. 8 and 9 present calculated output power conversion efficiencies of optimized Yb-S-FAP (~986 nm) and an Yb:$KY(WO_4)_2$ (~981 nm) ZPL lasers, as a function of the pump flux incident on the Yb:host gain element (and for the assumed Yb crystal and resonator values, listed in Table 2). In these calculations, the harmonic doubler is removed from the laser cavity, and the reflectivity of the output coupling mirror 25 at the ZPL transition wavelength nm is adjusted for maximum laser slope efficiency at the ZPL transition wavelength (e.g. ~986 and 981 nm, for S-FAP and $KY(WO_4)_2$, respectively). FIGS. 8 and 9, respectively, are calculated for assumed values of the product of the Yb doping concentration ($n_0$) and crystal gain element length (ls), equal to 2 and $4 \times 10^{19}$ ions/cm², respectively. From FIGS. 8 and 9, we see that the Yb-S-FAP laser has a lower threshold flux and a higher output power conversion efficiency than the Yb:$KY(WO_4)_2$ laser, for all of the pump flux values shown. For this reason, Yb-apatite laser crystals are preferred for use in the present invention. However, similar calculations for other Yb:host crystals shown in FIG. 3 indicate that the ZPL transition laser performance of Yb:$KY(WO_4)_2$ greatly exceeds that of the other host materials, and therefore Yb:$KY(WO_4)_2$ and Yb:$KGd(WO_4)_2$ are also preferred Yb doped crystal host materials for use in the present invention.

TABLE 2

Parameter Values for Modeling [26] the Laser Performance of Yb:S-FAP and Yb:KY(WO4)2 ZPL Transition Lasers.

| Parameter | Unit | S-FAP | KY(WO4)2 |
|---|---|---|---|
| f,a,p Initial Pump Stark Level Boltzman Fraction | | 0.7262 | 0.6055 |
| f,b,p Terminal Pump Stark Level Boltzman Fraction | | 0.0127 | 0.0653 |
| f,a,l Terminal Laser Stark Level Boltzman Fraction | | 0.7262 | 0.6055 |
| f,b,l Initial Laser Stark Level Boltzman Fraction | | 0.8117 | 0.7479 |
| no*ls = Yb concentration*crystal length (two cases) | E19 ion/cm2 | 2,4 | 2,4 |
| Spectroscopic pump transition cross-section | E-20 cm2 | 13.8 | 5 |
| Spectroscopic laser transition cross-section | E-20 cm2 | 15.4 | 1.8 |
| Pump transition wavelength | nm | 905 | 933 |
| Laser transition wavelength | nm | 985 | 981 |
| 2F/52 fluorescence decay time | msec | 1.1 | 0.6 |
| Crystal temperature | Kelvins | 300 | 300 |
| Cavity transmission | | 0.98 | 0.98 |
| Pump reflectivity | | 1 | 1 |
| Mode fill factor | | 0.9 | 0.9 |
| Pump delivery efficiency | | 1 | 1 |

Changes and modifications in the specifically described embodiments can be carried out without departing from the scope of the invention, which is intended to be limited by the scope of the appended claims.

REFERENCES

1]. C. C. Stewart, Multiparameter Flow Cytometry for Clinical Applications, New Technologies in Cytometry, SPIE 1063, 150 (1989).
2]. Lloyd M. Smith, J. Z. Sanders, R. J. Kaiser, P. Hughes, C. Dodd, C. R. Connell, C. Heiner, S. B. H. Kent, and L. E. Hood, Fluorescence Detection in Automated DNA Sequence Analysis, Nature, 321, 674 (1986).
3]. L. B. Koutny, D. Schaizing, T. A. Taylor, and M. Fuchs, Microchip Electrophoretic Immunoassay for Serum Cortisol, Anal. Chem., 68, 18 (19960.
4]. J. M. Prober, G. L. Trainor, R. J. Dam, F. W. Hobbs, C. W. Robertson, R. J. Zagursky, A. J. Cocuzza, M. A.

Jensen, and K. Baumeister, A System for Rapid DNA Sequencing with Fluorescent Chain-Terminating Dideoxynucleotides, Science, 238, 336 (1987).

5]. X. C. Huang, M. A. Quesada, and R. A. Mathies, DNA Sequencing Using Capillary Array Electrophoresis, Anal. Chem., 64, 2149 (1992).

6]. S. Takahashi, K. Murakami, T. Anazawa, and H. Kambara, Multiple Sheath-Flow Gel Capillary Electrophoresis for Multicolor Fluorescent DNA Detection, Anal. Chem., 66, 1021 (1994).

7]. K. M. O'Brien, J. Wren, V. K. Dave, D. Bai, S. Rayner, G. A. Evans, A. E. Dabiri, and H. R. Garner, ASTRAL, a Hyperspectral Imaging DNA Sequencer, Rev. Sci Instrum., 69, 2141 (1998).

8]. M. Koellner, How to Find the Sensitivity Limit for DNA Sequencing Based on Laser-Induced Fluorescence, Appl. Optics, 32, 806 (1993).

9]. J. Ju, C. Ruan, C. W. Fuller, A. N. Glazer, and R. A. Mathies, Fluorescence Energy Transfer Dye-Labeled Primers for DNA Sequencing and Analysis, Proc. Natl. Acad. Sci. USA, 92, 4347 (1995).

10]. S. C. Benson, P. Singh, and A. N. Glazer, "Heterodimeric DNA-Binding Dyes Designed for Energy Transfer: Synthesis and Spectroscopic Properties", Nucleic Acids Res., 21, 5757 (1993).

11]. K. Yamamoto, K. Mizuuchi, and T. Taniuchi, "Milliwatt-order Blue Light Generation in a periodically Domain-Inverted $LiTaO_3$ Waveguide", Optics Letters, 16, 1156 (1991).

12]. W. P. Risk, R. Pon, and W. Lenth, "Diode-laser Pumped Blue Light Source at 473 nm Using Intracavity Frequency Doubling of a 946 nm Nd:YAG Laser", Appl. Phys. Lett., 54, 1625 (1989).

13]. Y. Yamamoto, S. Yamaguchi, N. Yamada, T. Matsumoto, and Y. Yamada, "Deterioration of the Frequency-Conversion Efficiency of a $LiTaO_3$ Waveguide Device with Nonlinear Quasi-Phase-Matched Second Harmonic Generation", Jpn. J. Appl. Phys., 35, 3902 (1996).

14]. A. A. Kaminskii, "Laser Crystals", Optical Series, Vol. 14, Springer-Verlag, Berlin, 1981.

15]. L. D. DeLoach, S. A. Payne, L. L. Chase, L. K. Smith, W. L. Kway, and W. F. Krupke, Evaluation of Absorption and Emission Properties of $Yb^{3+}$ Doped Crystals for Laser Applications, IEEE J.Q.E., 29, 1179 (1993).

16]. S. A. Payne, L. D. DeLoach, L. K. Smith, W. L. Kway, J. B. Tassano, and W. F. Krupke, Ytterbium-Doped Apatite-Structure Crystals: A New Class of Laser Materials, J. Appl. Phys., 76, 497 (1994).

17]. N. V. Kuleshov, A. A. Lagatsky, A. V. Podlipensky, and V. P. Mikhailov, Pulsed Laser Operation of Yb-Doped $KY(WO_4)_2$ and $KGd(WO_4)_2$, Optics Letters, 22, 1317 (1997).

18]. L. D. DeLoach, S. A. Payne, L. K. Smith, L. Kway, and W. F. Krupke, Laser and Spectroscopic Properties of $YB;Sr_5(PO_4)_3F$, J. O. S. A., B11, 269 (1994).

19]. W. F. Krupke, S. A. Payne, L. L. Chase, and L. K. Smitm, Yb:FAP and Related Materials, Laser Gain Medium Comprising Same, and Laser Systems Using Same. U.S. Pat. No. 5,280,492

20]. S. A. Payne, W. L. Kway, L. D. DeLoach, W. F. Krupke, and B. H. T. Chai, Ytterbium and Neodymium Doped Vanadate Laser Host Crystals Having the Apatite Crystal Structure, U.S. Pat. No. 5,341,389.

21]. I. Biaggio, P. Kerkoc, L. S. Wu, and P. Guenter", Refractive Indices of Orthorhombic$KNbO_3$: Phase-Matching Configurations for Nonlinear-Optical Interactions", J. O. S. A., B9, 507 (1992).

22]. L. T. Cheng, L. Cheng, R. Harlow, and J. Bierlein, "Blue Light Generation Using Bulk Single Crystals of Niobium Doped KTP", Appl. Phys, Lett., 64, 155 (1994).

23]. G. M. Lociacono, R. Stolzenberger, and D Loiacono, "Modified KTP Crystals for Noncritical Phase Matching Applications", Appl. Phys. Lett., 64, 16 (1994).

24]. S. Lin, B. Wu, F. Xie, and C. Chen, "Phase-Matching Retracing Behavior: New Features in LBO", Appl. Phys. Lett., 59, 1541 (1991).

25]. P. Li-Kam-Wa, et. al., Simultaneous Dual Wavelength CW Lasing of $Yb^{3+}$ Doped Fluorapatite, Technical Digest, CLEO '93, p488 (1993).

26]. R. J. Beach, CW Theory of Quasi-Three-Level, End-Pumped Laser Oscillators, Opt. Communications, 123, 385 (1995).

TABLE 1

Zero-Phonon-Line Transition Wavelengths of Yb:Host Crystals [15]

| Host Crystals | ZPL Transition Wavelength (nm) |
|---|---|
| $LiYF_4$ (YLF) | 972.0 |
| $LaF_3$ | 974.7 |
| $SrF_2$ | 966.5 |
| $BaF_2$ | 966.7 |
| $KCaF_3$ | 972.0 |
| $KY_3F_{10}$ | 974.2 |
| $Rb_2NaYF_6$ | 968 |
| $BaY_2F_8$ | 972.6 |
| $Y_2SiO_5$ (YOS) | 979 |
| $Y_3Al_5O_{12}$ (YAG) | 968.3 |
| $YAlO_3$ (YAP) | 978.5 |
| $Ca_5(PO_4)_3F$ (FAP) | 983.5 |
| $Sr_5(PO_4)_3F$ (S-FAP) | 985.3 |
| $Sr_5(VO_4)_3F$ (S-VAP) | 986 |
| $LuPO_4$ | 976.1 |
| $LiYO_2$ | 972.6 |
| $ScBO_3$ | 974.6 |
| $KY(WO_4)_2$ | 981.4* |
| $KGd(WO_4)_2$ | 981.3* |

*values taken from ref [17].

TABLE 2

Parameter Values for Modeling [26] the Laser Performance of Yb:S-FAP and Yb:$KY(WO_4)_2$ ZPL Transition Lasers

| Parameter | Unit | S-FAP | $KY(WO_4)_2$ |
|---|---|---|---|
| f,a,p Initial Pump Stark Level Boltzman Fraction | | 0.7262 | 0.6055 |
| f,b,p Terminal Pump Stark Level Boltzman Fraction | | 0.0127 | 0.0653 |
| f,a,l Terminal Laser Stark Level Boltzman Fraction | | 0.7262 | 0.6055 |
| f,b,l Initial Laser Stark Level Boltzman Fraction | | 0.8117 | 0.7479 |
| no*ls = Yb concentration*crystal length (two cases) | E19 ion/cm2 | 2,4 | 2,4 |
| Spectroscopic pump transition cross-section | E-20 cm2 | 13.8 | 5 |
| Spectroscopic laser transition cross-section | E-20 cm2 | 15.4 | 1.8 |
| Pump transition wavelength | nm | 905 | 933 |
| Laser transition wavelength | nm | 985 | 981 |
| 2F/52 fluorescence decay time | msec | 1.1 | 0.6 |
| Crystal temperature | Kelvins | 300 | 300 |
| Cavity transmission | | 0.98 | 0.98 |
| Pump reflectivity | | 1 | 1 |
| Mode fill factor | | 0.9 | 0.9 |
| Pump delivery efficiency | | 1 | 1 |

What is claimed is:

1. A ytterbium-doped solid state laser with an output wavelength in the ~490–496 nm region, comprising:
   a resonant optical cavity;
   a ytterbium-doped solid state laser gain medium within said resonant optical cavity;
   means for optically pumping said laser gain medium;
   an inter-cavity polarizer for forcing said solid state laser gain medium to generate laser light on the zero-phonon-line (ZPL) transition of the 2F5/2–2F7/2 resonance emission band of said gain medium, wherein said inter-cavity polarizer is oriented to allow transmission of polarized light matching the predominant polarization of said ZPL transition of said ytterbium-doped solid state laser gain medium, while providing loss for non-ZPL transitions emitting predominantly in the orthogonal polarization with respect to the polarization of said ZPL of said ytterbium-doped solid state laser gain medium; and
   a nonlinear harmonic doubler crystal for doubling the frequency of said zero-phonon-line (ZPL) transition of the 2F5/2–2F7/2 resonance emission band of said gain medium.

2. The ytterbium-doped solid state laser of claim 1, wherein said means for optically pumping said laser gain medium comprise at least one laser diode.

3. The ytterbium-doped solid state laser of claim 1, further comprising dichroic optics to provide wavelength discrimination for said laser light within said resonant cavity on said ZPL.

4. The ytterbium-doped solid state laser of claim 1, wherein said ytterbium-doped solid state laser gain medium comprises a crystal having an apatite structure.

5. The ytterbium-doped solid state laser of claim 1, wherein said ytterbium-doped solid state laser gain medium comprises a crystal having an apatite structure, doped with trivalent ytterbium ($Yb^{3+}$).

6. The ytterbium-doped solid state laser of claim 1, wherein said ytterbium-doped solid state laser gain medium comprises a crystal having an apatite structure, doped with trivalent ytterbium ($Yb^{3+}$) and is selected from a group consisting of $Sr_5(VO_4)_3F$ (S-VAP), $Ca_5(PO_4)_3F$ (C-FAP), $Sr_5(PO_4)_3F$ (S-FAP), $Ba_5(PO_4)_3F$ (B-FAP) and $M_5(AO_4)_3F$ where A is selected from a group consisting of P and V and M is selected from a group consisting of Ca, Sr, Br and Pb.

7. The ytterbium-doped solid state laser of claim 1, wherein said ytterbium-doped solid state laser gain medium comprises a double tungstate crystal of the form (Ha)(RE)(WO$_4$)$_2$, doped with trivalent ytterbium ($Yb^{3+}$), and wherein Ha is a monovalent alkali ion selected from a group consisting of Li, Cs, Na, Rb$^+$ and K, and wherein RE is a trivalent rare earth ion selected from a group consisting of La, Gd and Lu ions.

8. The ytterbium-doped solid state laser of claim 1, wherein said ytterbium-doped solid state laser gain medium comprises a crystal having a double tungstate composition, doped with trivalent ytterbium ($Yb^{3+}$) and is selected from a group consisting of $KY(WO_4)_2$, $KGd(WO_4)_2$, and $KLu(WO_4)_2$.

9. The ytterbium-doped solid state laser of claim 1, wherein said ytterbium-doped solid state laser gain medium comprises a C-FAP ($Ca_5(PO_4)_3F$) crystal having an apatite structure that is doped with trivalent ytterbium ($Yb^{3+}$).

10. The ytterbium-doped solid state laser of claim 1, wherein said ytterbium-doped solid state laser gain medium comprises a S-FAP ($Sr_5(PO_4)_3F$) crystal having an apatite structure that is doped with trivalent ytterbium ($Yb^{3+}$).

11. The ytterbium-doped solid state laser of claim 1, wherein said ytterbium-doped solid state laser gain medium comprises $M_5(PO_4)_3F$, where M is selected from a group consisting of Ca, Sr, Ba and Pb, has an apatite structure, and is doped with trivalent ytterbium ($Yb^{3+}$).

12. The ytterbium-doped solid state laser of claim 1, wherein said ytterbium-doped solid state laser gain medium comprises a S-VAP ($Sr_5(VO_4)_3F$) crystal having an apatite structure that is doped with trivalent ytterbium ($yb^{3+}$).

13. The ytterbium-doped solid state laser of claim 1, wherein said ytterbium-doped solid state laser gain medium comprises a $KY(WO_4)_2$ crystal having a double tungstate composition that is doped with trivalent ytterbium ($Yb^{3+}$).

14. The ytterbium-doped solid state laser of claim 1, wherein said ytterbium-doped solid state laser gain medium comprises a $KGd(WO_4)_2$ crystal having a double tungstate composition that is doped with trivalent ytterbium ($Yb^{3+}$).

15. The ytterbium-doped solid state laser of claim 1, wherein said ytterbium-doped solid state laser gain medium comprises a $KLu(WO_4)_2$ crystal having a double tungstate composition that is doped with trivalent ytterbium ($Yb^{3+}$).

16. The ytterbium-doped solid state laser of claim 1, wherein said nonlinear harmonic doubler crystal is selected from a group consisting of LBO, $KNbO_3$ and KTP.

17. The ytterbium-doped solid state laser of claim 1, wherein said nonlinear harmonic doubler crystal comprises KTP doped with tantalum.

18. The ytterbium-doped solid state laser of claim 1, wherein said nonlinear harmonic doubler crystal comprises KTP doped with niobium.

19. The ytterbium-doped solid state laser of claim 1, wherein said nonlinear harmonic doubler crystal comprises KTP doped with sodium.

20. A method for optically pumping a dye solution, comprising:
   providing a ytterbium-doped solid state laser gain medium within an optical cavity;
   optically pumping said laser gain medium;
   forcing said solid state laser gain medium to emit laser light on the zero-phonon-line (ZPL) transition of the 2F5/2–2F7/2 resonance emission band of said gain medium, wherein said step of forcing said solid state laser gain medium to emit laser light on the zero-phonon-line (ZPL) transition is carried out with an inter-cavity polarizer, wherein said inter-cavity polarizer is oriented to allow transmission of polarized light matching the predominant polarization of said ZPL transition of said ytterbium-doped solid state laser gain medium, while increasing the effective losses for non-ZPL transitions emitting predominantly in the orthogonal polarization with respect to the polarization of said ZPL of said ytterbium-doped solid state laser gain medium;
   doubling the frequency of said zero-phonon-line (ZPL) transition of said 2F5/2–2F7/2 resonance emission band of said gain medium to produce second harmonic light within the wavelength range of 490 nm to 496 nm; and
   directing said second harmonic light onto a dye solution having an excitation band within the wavelength range of 490 nm to 496 nm.

21. The method of claim 20, wherein said dye solution comprises dye selected from a group consisting of fluorescein isothiocyanate dye and phycoerthrin dye.

22. The method of claim 20, further comprising:
   selectively labeling the bases of DNA fragments with dye selected from a group consisting of fluorescein isothiocyanate dye and phycoerthrin dye to produce dye labeled DNA fragments;

passing said dye labeled DNA fragments through multiple channels of a multichannel electrophoresis sequencing apparatus;

illuminating said muliple channels with said second harmonic light, wherein one fluorescent color will fluoresce for each of the labeled bases of DNA; and detecting the position of each said fluorescent color to determine the base sequence of said DNA fragments.

23. The method of claim 22, wherein the step of forcing said solid state laser gain medium to emit laser light on the zero-phonon-line (ZPL) transition includes forming said optical cavity with dichroic optics having a reflection bandwidth narrow enough to allow laser oscillation only on said zero-phonon-line (ZPL) transition.

24. The method of claim 22, wherein the step of producing laser radiation includes providing an ytterbium-doped solid state laser gain medium comprising a crystal having an apatite structure.

25. The method of claim 22, wherein the step of producing laser radiation includes providing an ytterbium-doped solid state laser gain medium comprising a crystal having an apatite structure, doped with trivalent ytterbium ($Yb^{3+}$).

26. The method of claim 22, wherein the step of producing laser radiation includes providing a ytterbium-doped solid state laser gain medium comprising a crystal having an apatite structure, doped with trivalent ytterbium ($Yb^{3+}$), wherein said laser gain medium is selected from a group consisting of C-FAP, S-FAP, S-VAP, B-FAP and $M_5(AO_4)_3F$ where A is selected from a group consisting of P and V and M is selected from a group consisting of Ca, Sr, Br and Pb.

27. The method of claim 22, wherein the step of producing laser radiation includes providing a ytterbium-doped solid state laser gain medium comprising a double tungstate crystal of the form $(Ha)(RE)(WO_4)_2$, doped with trivalent ytterbium ($Yb^{3+}$), and wherein Ha is a monovalent alkali ion selected from a group consisting of Li, Cs, Na, Rb and K, and wherein RE is a trivalent rare earth ion selected from a group consisting of La, Gd and Lu ions.

28. The method of claim 22, wherein the step of producing laser radiation includes providing a ytterbium-doped solid state laser gain medium comprises a crystal selected from a group consisting of a C-FAP crystal and an S-FAP crystal, wherein said crystal has an apatite structure that is doped with trivalent ytterbium ($Yb^{3+}$).

29. The method of claim 20, further comprising:

selectively staining chromosomal DNA fragments with fluorescent dye selected from a group consisting of fluorescein isothiocyanate dye and phycoerthrin dye to produce dye stained chromosomal DNA fragments;

passing said dye stained chromosomal DNA fragments through multiple channels of a multi-channel electrophoresis sequencing apparatus, wherein said second harmonic light is directed onto said dye solution by illuminating said muliple channels with said second harmonic light, wherein one fluorescent color will fluoresce for each of the four genetic letters A, G, T, C of said chromosomal DNA; and detecting the position of each said fluorescent color to read the genetic letter sequence of said chromosomal DNA fragments.

30. The method of claim 29, wherein the step of forcing said solid state laser gain medium to emit laser light on the zero-phonon-line (ZPL) transition includes forming said optical cavity with dichroic optics having a reflection bandwidth narrow enough to allow laser oscillation only on said zero-phonon-line (ZPL) transition.

31. The method of claim 29, wherein the step of producing laser radiation includes providing an ytterbium-doped solid state laser gain medium comprising a crystal having an apatite structure.

32. The method of claim 29, wherein the step of producing laser radiation includes providing an ytterbium-doped solid state laser gain medium comprising a crystal having an apatite structure, doped with trivalent ytterbium ($Yb^{3+}$).

33. The method of claim 29, wherein the step of producing laser radiation includes providing a ytterbium-doped solid state laser gain medium comprising a crystal having an apatite structure, doped with trivalent ytterbium ($Yb^{3+}$), wherein said laser gain medium is selected from a group consisting of C-FAP, S-FAP, S-VAP, B-FAP and $M_5(AO_4)_3F$ where A is selected from a group consisting of P and V and M is selected from a group consisting of Ca, Sr, Br and Pb.

34. The method of claim 29, wherein the step of producing laser radiation includes providing a ytterbium-doped solid state laser gain medium comprising a double tungstate crystal of the form $(Ha)(RE)(WO_4)_2$, doped with trivalent ytterbium ($Yb^{3+}$), and wherein Ha is a monovalent alkali ion selected from a group consisting of Li, Cs, Na and K, and wherein RE is a trivalent rare earth ion selected from a group consisting of La, Gd and Lu ions.

35. The method of claim 29, wherein the step of producing laser radiation includes providing a ytterbium-doped solid state laser gain medium comprises a C-FAP crystal having an apatite structure that is doped with trivalent ytterbium ($Yb^{3+}$).

36. The method of claim 20, further comprising:

selectively staining blood or bone marrow cells with antibodies tagged with at least one fluorescent dye, wherein said at least one fluorescent dye is selected from a group consisting of fluorescein isothiocyanate dye and phycoerthrin dye to produce dye stained cells;

passing said dye stained cells in liquid suspension single file in a cell flow stream through a flow cytometer apparatus, wherein said second harmonic light is directed onto said dye solution by illuminating said cell flow stream with said second harmonic light, wherein each fluorescent dye excited will fluoresce at its characteristic wavelength; and detecting said characteristic wavelength to immunotype cells labeled with specific antibodies.

37. The method of claim 36, wherein the step of forcing said solid state laser gain medium to emit laser light on the zero-phonon-line (ZPL) transition includes forming said optical cavity with dichroic optics having a reflection bandwidth narrow enough to allow laser oscillation only on said zero-phonon-line (ZPL) transition.

38. The method of claim 36, wherein the step of producing laser radiation includes providing an ytterbium-doped solid state laser gain medium comprising a crystal having an apatite structure.

39. The method of claim 36, wherein the step of producing laser radiation includes providing an ytterbium-doped solid state laser gain medium comprising a crystal having an apatite structure, doped with trivalent ytterbium ($Yb^{3+}$).

40. The method of claim 36, wherein the step of producing laser radiation includes providing a ytterbium-doped solid state laser gain medium comprising a crystal having an apatite structure, doped with trivalent ytterbium ($Yb^{3+}$), wherein said laser gain medium is selected from a group consisting of C-FAP, S-FAP, B-FAP, S-VAP and $M_5(AO_4)_3F$ where A is selected from a group consisting of P and V and M is selected from a group consisting of Ca, Sr, Br and Pb.

41. The method of claim 36, wherein the step of producing laser radiation includes providing a ytterbium-doped solid state laser gain medium comprising a double tungstate crystal of the form $(Ha)(RE)(WO_4)_2$, doped with trivalent ytterbium ($Yb^{3+}$), and wherein Ha is a monovalent alkali ion selected from a group consisting of Li, Cs, Na, Rb and K, and wherein RE is a trivalent rare earth ion selected from a group consisting of La, Gd and Lu ions.

42. The method of claim 36, wherein the step of producing laser radiation includes providing a ytterbium-doped solid state laser gain medium comprises a C-FAP crystal having an apatite structure that is doped with trivalent ytterbium ($Yb^{3+}$).

* * * * *